United States Patent Office 3,310,034
Patented Mar. 21, 1967

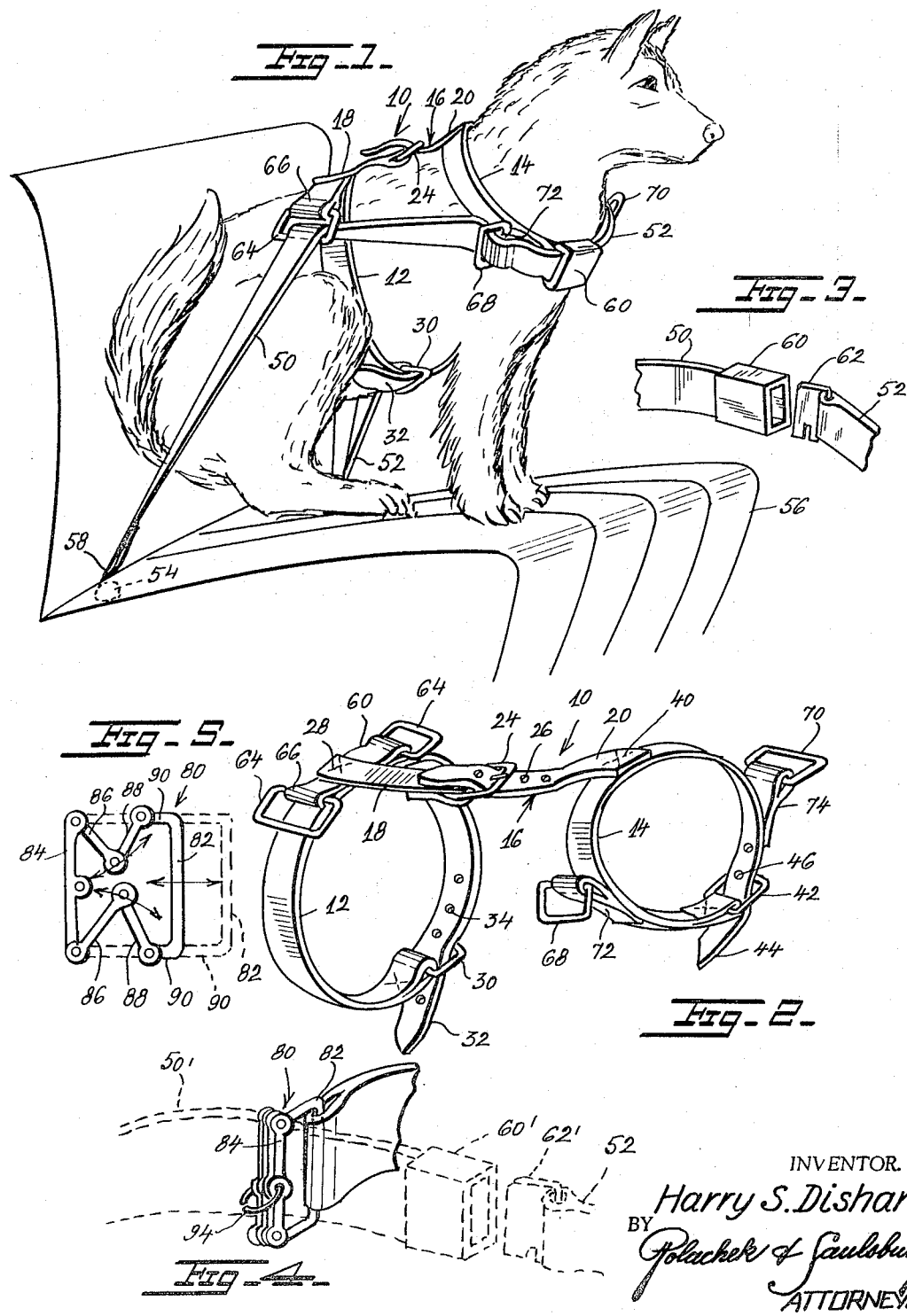

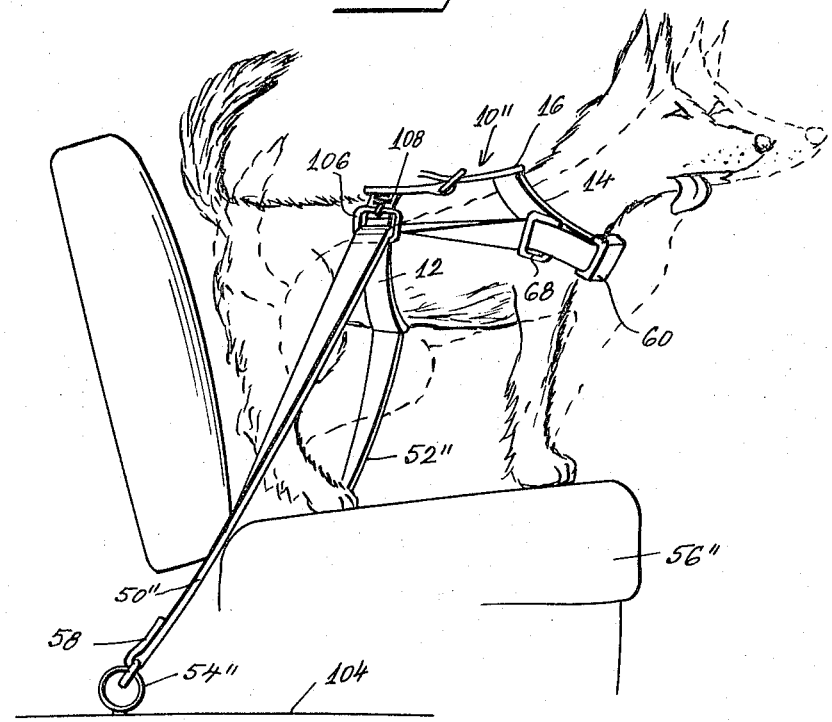
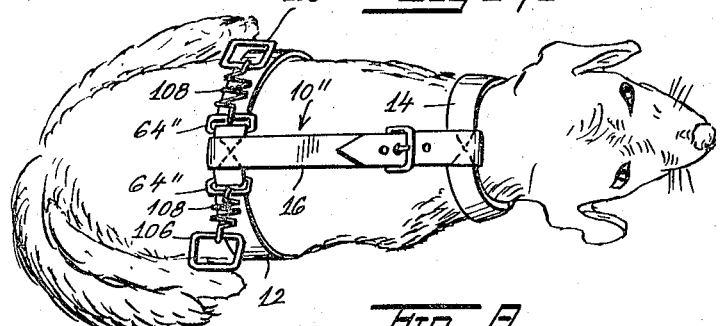
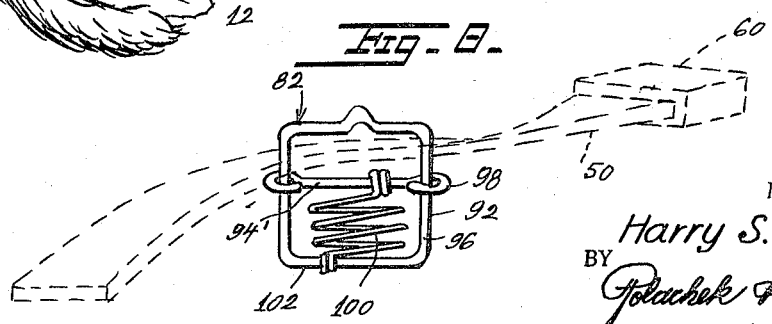

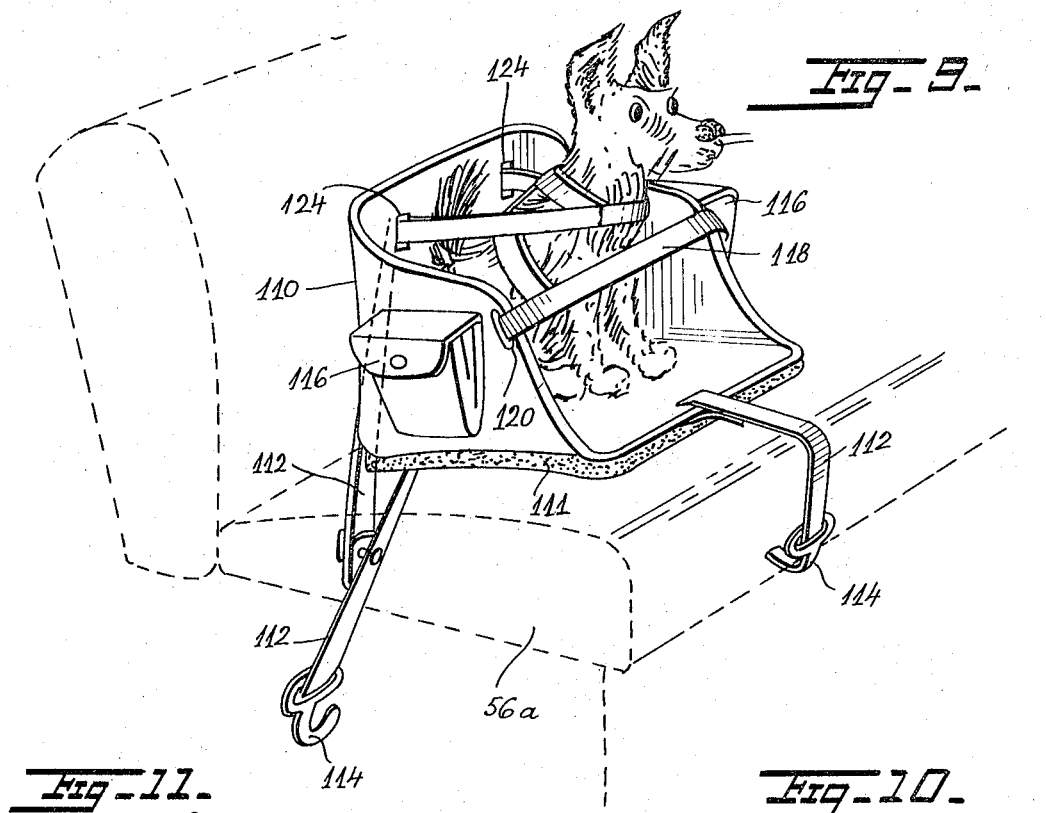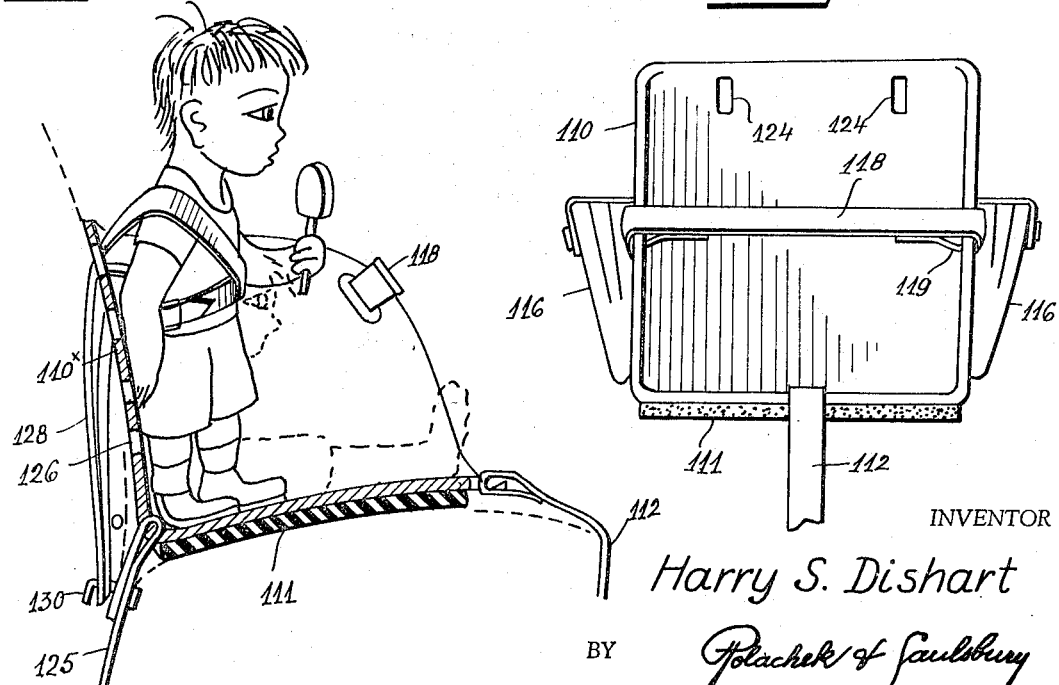

1

3,310,034
SAFETY HARNESS AND COLLAR
Harry S. Dishart, 137 Prospect Park SE.,
Brooklyn, N.Y. 11218
Filed Sept. 9, 1965, Ser. No. 486,152
12 Claims. (Cl. 119—96)

This invention relates generally to dog harness and more particularly to safety harness for use in protecting a dog from injury while riding in an automobile.

Difficulty is experienced in restraining a dog while riding in an automobile to protect it from injury as a dog dislikes being confined to a seat and much prefers to move back and forth and stick his nose out of the window, thereby distracting the attention of the automobile driver from driving and annoying the passengers.

It is accordingly a principal object of the present invention to provide a practical, very simple harness which is easily installed in an automobile to protect a dog from jumping out of the vehicle, from moving around in the vehicle, and from being thrown against the dash panel or windshield upon a sudden stop of the vehicle.

Another object of the invention is to provide a harness of this type that is comfortable to wear, rapidly and easily fitted to the body of the dog and which will safely withstand a sudden stress many times greater than that resulting from an automobile accident without harm to the dog.

A further object of the invention is to provide a safety harness of this type that is sturdy and inexpensive to manufacture and decorative in appearance.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

FIG. 1 is a perspective view of safety harness made in accordance with the present invention shown secured in place to an automobile seat and fastened about the body of a dog.

FIG. 2 is a top perspective view of a portion of the harness.

FIG. 3 is a perspective detail view of the strap locking mechanism.

FIG. 4 is a perspective view of a modified form of guide ring, the fastening seat straps being shown in dash lines, the ring being shown in collapsed condition.

FIG. 5 is a plan view of the guide ring of FIG. 4 in partly extended condition in full lines, in fully expanded condition in dash lines.

FIG. 6 is a view similar to FIG. 1 of a safety harness embodying another modified form of the invention, the dog being shown standing up on the seat and in forward moved position in dash lines.

FIG. 7 is a top plan view of the dog with part of the harness in place, the dog being shown in seated position.

FIG. 8 is a front elevational view of a guide ring, embodying another modified form of the invention, a fastening seat strap being shown in dash lines.

FIG. 9 is a view similar to FIG. 1 of safety harness embodying still another modified form of the invention.

FIG. 10 is a front elevational view of the basket.

FIG. 11 is a vertical sectional view of a basket embodying still another modified form of the invention.

Referring now in detail to the various views of the drawings, in FIG. 1 a safety dog harness embodying one form of the invention is shown and designated generally at 10. The harness 10 comprises broadly a bellyband or body strap 12, a combined neck and chest strap 14, and a back strap 16 made in two pieces 18 and 20 with

2 a buckle 24 on the end of piece 18 cooperating with the end of piece 20 which is suitably apertured as at 26 for adjusting the overall length of the harness. The straps are formed of leather.

The bellyband or body strap 12 is fixed to the rear end of the back strap 16 by fastening member 28 or other suitable means. The body strap includes a buckle 30 fastened to one end thereof adapted to cooperate with the other end 32 thereof which is suitably apertured as at 34 for adjustably tightening the body strap 12 about the body of the dog.

The combined neck and chest strap 14 is fixed to the front end of the back strap 12 by fastening member 40 or other suitable means, including a buckle 42 fastened to one end thereof adapted to cooperate with the other end 44 thereof which is suitably apertured as at 46 for adjustably tightening the strap 14 around the neck and chest of the dog.

In accordance with the invention, a pair of elongated flexible flat seat straps 50, 52 are provided for fastening the harness to a pair of eye-bolts 54 anchored in the back of the seat 56 of the automobile. Each seat strap has a loop 58 formed at one end secured to an eye-bolt 54. The other end of strap 50 is provided with a keeper member 60 of a locking mechanism, while the strap 52 is provided with a hooked plate 62 adapted to interlock with the keeper member 60. The straps 50, 52 pass loosely through rings 64, 64 carried on the ends of leather loops 66, 66 secured between the rear end of the back strap 16 and the body of the bellyband or body strap 12, at the rear of the harness, and loosely through similar rings 68 and 70 carried on the ends of leather loops 70 and 72 secured to the neck and chest strap 14 adjacent the buckle 42 and adjacent the apertured end 44, respectively, as shown in FIG. 2.

In use, the looped ends of the seat straps 50 and 52 are threaded through the front and rear rings and anchored to the eye-bolts 54. The harness is then placed around the dog, the body and neck straps buckled and the locking plate 62 inserted into the keeper member 60 and snapped into interlocking engagement therein.

In assembling, instead of threading the looped end of the straps 50 and 52 through the front and rear guide rings as aforesaid the harness may be provided with expansible guide rings such as the ring 80 shown in FIGS. 3 and 4 or the space adjusting ring or frame 82 shown in FIG. 8 to take the place of rings 64, 64, 68 and 70.

The expansible ring 80 has a U-shaped body 82 and a flat bar 84 pivotally connected by a pair of links 86, 88 interposed between the ends of the leg portions 90 of the U-shaped body and the ends of the bar 84, the inner ends of the links being overlapped and pivoted to each other. By reason of this construction, the ring may be extended to the condition shown in dash lines in FIG. 4 or may be collapsed to the condition shown in full lines in FIG. 3. When rings such as ring 80 are used, the ring may be expanded and the keeper member 60' on the end of seat strap 50' may be inserted through the ring as shown in dash lines in FIG. 3 to interlocking position with the plate 62' on strap 52'. A split spring ring 94, inserted through the overlapping ends of the links, may be used to hold the ring in collapsed condition to prevent withdrawal of the keeper member 60'.

The modified form of guide ring or frame 82 shown in FIG. 8 comprises a continuous rectangular-shaped round wire body 92 with a round wire rod 94' extending across the space between the sides 96 of the body and formed with loops 98 at the ends thereof to permit the rod to slide along the sides. A compression spring 100 is interposed between the rod 94 and the bottom 102 of the body of the ring with one end looped around the rod 94 and its other end looped around the bottom 102 urging the rod upwardly.

When rings, such as the ring 82 are used, the rod 94 is manually pressed downwardly against the action of spring 100 thereby enlarging the opening in the ring to permit the keeper 60 on strap 50 to be threaded through the ring for connection with the other end of the seat strap, and when pressure is released to automatically shorten the opening to prevent withdrawal of the keeper.

In FIGS. 6 and 7, a slightly modified form of dog safety harness 10″ is shown on a dog standing upon the seat 56″ of the automobile. In this form, the seat straps 50″ and 52″ are shown anchored to eye-bolts 54″ fastened to the floor 104 of the automobile behind the seat, only one eye-bolt being shown. The harness 10″ differs from the harness 10 merely in connecting another ring 106 to each rear ring 64″, 64″ by means of a compression spring 108 and threading the seat straps 50″ and 52″ through the rings 106 thereby providing additional flexibility sidewise permitting the dog to stand up, flex his rear legs and to be thrust forward a short distance as seen in dash lines in FIG. 5, when in an accident. The spring also absorbs the initial shock in an accident. Rings such as the ring 82 shown in FIG. 8 may be used in place of the rings 106.

In all other respects, the harness 10″ is similar to harness 10 and similar reference numerals are used to indicate similar parts throughout.

Referring now to the modified form of the invention shown in FIGS. 9 and 10, herein a fabric basket 110 open at the top and front is shown supported on a rubber cushion pad 111 on the automobile seat 56a. The basket is fastened to the seat by means of front and side straps 112 having hooks 114. The front strap is hooked onto the front of the seat and the side straps are hooked onto upstanding protuberances (not shown) on the floor of the automobile. The basket is provided with pockets 116 on both sides thereof. A strap 118 spans the front opening in the basket and is anchored at its ends by loops 119 through slots 120 in the basket. Another strap 122 has its ends fastened to the side straps 112 and extends loosely through a pair of spaced horizontal slots 124 in the basket at the top thereof. A dog is shown seated on the base of the basket and restrained by the strap 122 which is shown looped around the dog's neck.

In FIG. 11, a modified form of basket 110x is shown differing from basket 110 in that instead of the horizontally disposed slots 124 a series of vertically disposed spaced slots 126 are formed in the rear of the basket to receive a strap 128 looped around a hooked rivet 130 extending from the looped end of a rear strap 125, strap 128 being adapted to pass through a pair of adjacent slots 126 and be fastened around a child shown standing on the base of the basket. The strap 128 may pass through any pair of slots 126 so as to be fastened around various sizes of children or around a child who is seated as shown in dash lines.

While I have illustrated and described the preferred embodiments of my invention, it is to be understood that I do not limit myself to the precise constructions herein disclosed and that various changes and modifications may be made within the scope of the invention as defined in the appended claims.

Having thus described my invention, what I claim as new, and desire to secure by United States Letters Patent is:

1. A dog safety harness comprising a back strap adapted to overlie the back of a dog, strap means for embracing the neck and chest of a dog and secured to one end of said back strap, a body encircling strap secured to the other end of the back strap, a pair of elongated straps, means on one end of the straps for fastening said one end to a seat in an automobile, means on the other end of the pair of straps for fastening said other ends to each other around the chest of a dog positioned on a seat of an automobile, and means for guiding said pair of straps along the body of a dog for encirclement around the chest of the dog.

2. A dog safety harness comprising a back strap adapted to overlie the back of a dog, strap means for embracing the neck and chest of a dog and secured to one end of said back strap, a body encircling strap secured to the other end of the back strap, a pair of elongated straps, means on one end of the straps for fastening said one end to a seat in an automobile, means on the other end of the pair of straps for fastening said other ends to each other around the chest of a dog positioned on a seat of an automobile, and means for guiding said pair of straps along the body of a dog for encirclement around the chest of the dog, said other end fastening means including a slotted keeper member on the end of one of said pair of straps and a plate on the end of the other strap of said pair of straps adapted to be inserted into said keeper member and interlock therewith.

3. A dog safety harness comprising a back strap adapted to overlie the back of a dog, strap means for embracing the neck and chest of a dog and secured to one end of said back strap, a body encircling strap secured to the other end of the back strap, a pair of elongated straps, means on one end of the straps for fastening said one end to a seat in an automobile, means on the other end of the pair of straps for fastening said other ends to each other around the chest of a dog positioned on a seat of an automobile, means for guiding said pair of straps along the body of a dog for encirclement around the chest of the dog, said guiding means including looped straps secured between the rear end of the back strap and the body encircling strap and extending laterally of the end of the back strap, rings loosely fastened to the free ends of the looped straps, looped straps secured to the neck and chest embracing strap means, and extending lengthwise thereof in opposed directions, and rings loosely fastened to the free ends of the last-named looped straps.

4. A dog safety harness comprising a back strap adapted to overlie the back of a dog, strap means for embracing the neck and chest of a dog and secured to one end of said back strap, a body encircling strap secured to the other end of the back strap, a pair of elongated straps, means on one end of the straps for fastening said one end to a seat in an automobile, means on the other end of the pair of straps for fastening said other ends to each other around the chest of a dog positioned on a seat of an automobile, and means for guiding said pair of straps along the body of a dog for encirclement around the chest of the dog, said other end fastening means including a slotted keeper member on the end of one of said pair of straps and a plate on the end of the other strap of said pair of straps adapted to be inserted into said keeper member and interlock therewith, said guiding means including looped straps secured between the rear end of the back strap and the body encircling strap and extending laterally of the end of the back strap, rings loosely fastened to the free end of the looped straps, looped straps secured to the neck and chest embracing strap means, and extending lengthwise thereof in opposed directions and rings loosely fastened to the free end of the last-named looped straps.

5. A dog safety harness comprising a back strap adapted to overlie the back of a dog, strap means for embracing the neck and chest of a dog and secured to one end of said back strap, a body encircling strap secured to the other end of the back strap, looped straps secured between the rear end of the back strap and the body encircling strap and extending laterally of the end of the back strap, rings loosely fastened to the free end of the looped straps, looped straps secured to the neck and chest strap and extending lengthwise of said latter strap, rings loosely fastened to the free ends of said last-named looped straps, a pair of elongated straps extending through said rings along the body of a dog, means on one end of the straps for fastening said one end to a seat in an automobile, and means on the other end of the straps for fastening said other ends to each other around the chest of a dog positioned on a seat in an automobile.

6. A dog safety harness comprising a back strap adapted to overlie the back of a dog, strap means for embracing the neck and chest of a dog and secured to one end of said back strap, a body encircling strap secured to the other end of the back strap, looped straps secured between the rear end of the back strap and the body encircling strap and extending laterally of the end of the back strap, rings loosely fastened to the free end of the looped straps, looped straps secured to the neck and chest strap and extending lengthwise of said latter strap, rings loosely fastened to the free ends of said last-named looped straps, a pair of elongated straps extending through said rings along the body of a dog, means on one end of the straps for fastening said one end to a seat in an automobile, and means on the other end of the straps for fastening said other ends to each other around the chest of a dog positioned on a seat in an automobile, said other end fastening means including a slotted keeper member on the end of one of said pair of straps and a plate on the end of the other strap of said pair of straps adapted to be inserted into said keeper member and interlock therewith.

7. A dog safety harness as defined in claim 3, wherein the rings are each extensible having a U-shaped body, a flat bar and pivoted links interposed between the ends of the leg portions of the U-shaped body and the ends of the flat bar, said links pivotally connected to said leg portions and bar ends and pivotally connected to each other, whereby the links may be extended or collapsed.

8. A dog safety harness as defined in claim 3, wherein the rings are each extensible having a U-shaped body, a flat bar and pivoted links interposed between the ends of the leg portions of the U-shaped body and the ends of the flat bar, said links pivotally connected to said leg portions and bar ends and pivotally connected to each other, whereby the links may be extended or collapsed, and a split ring for holding the links in collapsed condition.

9. A dog safety harness as defined in claim 3, wherein the rings each has means for adjusting the opening in the ring, said means including a rod extending across the opening in the ring and slidable therein, and a compression spring interposed between said rod and one end of the ring for urging the rod toward the other end.

10. A dog safety harness comprising, in combination, a motor vehicle including a seat, a pair of eye-bolts secured to the rear of said seat, spaced straps for encircling the neck and body of a dog, a strap connecting said spaced straps, and a pair of straps connected at one end to each other, connected intermediate the ends to said spaced straps and connected at the other end to said eye-bolts.

11. A dog safety harness comprising, in combination, a motor vehicle including a seat, a pair of eye-bolts secured to the rear of said seat, spaced straps for encircling the neck and body of a dog, a strap connecting said spaced straps, and a pair of straps connected at one end to each other, connected intermediate the ends to said spaced straps and connected at the other end to said eye-bolts, said spaced straps being adjustable for fitting the straps around the body of a dog, said connecting strap being adjustable to adjust the overall length of the harness.

12. A dog safety harness comprising, in combination, a motor vehicle including a seat, a pair of eye-bolts secured to the rear of said seat, spaced straps for encircling the neck and body of a dog, a strap connecting said spaced straps, and a pair of straps connected at one end to each other, connected intermediate the ends to said spaced straps and connected at the other end to said eye-bolts, said spaced straps being adjustable for fitting the straps around the body of a dog, said connecting strap being adjustable to adjust the overall length of the harness, the connection between the pair of straps and said spaced straps serving as guide means for guiding the pair of straps along the body of a dog.

References Cited by the Examiner

UNITED STATES PATENTS

| 1,300,914 | 4/1919 | Barnhart | 119—96 |
| 1,614,083 | 1/1927 | Plantico | 119—96 |
| 2,909,154 | 10/1959 | Thomas | 119—109 |
| 3,174,798 | 3/1965 | Sprague | 297—385 |

SAMUEL KOREN, *Primary Examiner.*

HUGH R. CHAMBLEE, *Examiner.*